(12) United States Patent
Strasman

(10) Patent No.: US 9,143,838 B2
(45) Date of Patent: Sep. 22, 2015

(54) DEVICE AND METHOD FOR QUALITY ASSESSMENT OF ENCRYPTED STREAMING MEDIA FLOWS

(75) Inventor: Nery Strasman, Ramat Gan (IL)

(73) Assignee: VASONA NETWORKS INC., Santa Clara, CA (US)

(*) Notice: Subject to any disclaimer, the term of this patent is extended or adjusted under 35 U.S.C. 154(b) by 1031 days.

(21) Appl. No.: 13/225,447

(22) Filed: Sep. 4, 2011

(65) Prior Publication Data

US 2012/0066281 A1 Mar. 15, 2012

Related U.S. Application Data

(60) Provisional application No. 61/380,281, filed on Sep. 6, 2010.

(51) Int. Cl.
G06F 17/15 (2006.01)
H04N 21/647 (2011.01)

(52) U.S. Cl.
CPC .............................. *H04N 21/64723* (2013.01)

(58) Field of Classification Search
CPC ............................................... H04N 21/64723
USPC ..................................... 708/424; 375/240.01
See application file for complete search history.

(56) References Cited

U.S. PATENT DOCUMENTS

| | | | |
|---|---|---|---|
| 5,734,677 A * | 3/1998 | Liew et al. ..................... | 375/240 |
| 6,385,673 B1 | 5/2002 | DeMoney | |
| 6,697,378 B1 | 2/2004 | Patel | |
| 8,000,475 B1 | 8/2011 | Guman | |
| 8,205,004 B1 | 6/2012 | Kaufman et al. | |
| 2002/0196714 A1 * | 12/2002 | Tada et al. .................. | 369/30.12 |
| 2003/0067872 A1 | 4/2003 | Harrell et al. | |
| 2004/0203825 A1 | 10/2004 | Daniel et al. | |
| 2005/0036496 A1 | 2/2005 | Tang | |
| 2005/0114538 A1 | 5/2005 | Rose | |
| 2005/0148314 A1 | 7/2005 | Taglienti et al. | |
| 2005/0185635 A1 | 8/2005 | Nagendra | |
| 2005/0190794 A1 * | 9/2005 | Krause et al. ................. | 370/485 |
| 2005/0204046 A1 | 9/2005 | Watanabe | |
| 2007/0044133 A1 | 2/2007 | Hodecker | |
| 2008/0133766 A1 | 6/2008 | Luo | |
| 2008/0212480 A1 | 9/2008 | Shimonishi | |

(Continued)

FOREIGN PATENT DOCUMENTS

WO  WO/2006/116483  11/2006

OTHER PUBLICATIONS

XP002617719; Mar. 23, 2009; Alex Zambelli; IIS Streaming Technical Overview.

*Primary Examiner* — Mohammed Rahaman
(74) *Attorney, Agent, or Firm* — Reches Patents

(57) ABSTRACT

A device, computer program product and a method, the method may include: extracting a first size information about sizes of different frames of a first segment of an encrypted first streaming media flow that has a first constant bit rate (CBR); extracting second size information about sizes of different frames of a second segment of a second streaming media flow that has a second CBR; and determining a relationship between qualities of the first and second streaming media flows based on the first and second size information; wherein the extracting of the first and second size information and the determining of the relationship are executed without decrypting the first and second encrypted streaming media flows.

21 Claims, 5 Drawing Sheets

(56) References Cited

U.S. PATENT DOCUMENTS

| | | |
|---|---|---|
| 2009/0041114 A1* | 2/2009 | Clark ............... 375/240.01 |
| 2009/0187673 A1 | 7/2009 | Ramjee et al. |
| 2009/0327079 A1 | 12/2009 | Parker et al. |
| 2010/0034089 A1 | 2/2010 | Kovvali et al. |
| 2010/0074275 A1 | 3/2010 | Sahai |
| 2010/0080290 A1 | 4/2010 | Mehrotra |
| 2010/0131659 A1 | 5/2010 | Narayana et al. |
| 2010/0131671 A1 | 5/2010 | Kohli et al. |
| 2010/0135392 A1* | 6/2010 | Kim ............... 375/240.13 |
| 2010/0151899 A1 | 6/2010 | Lekutai |
| 2010/0195602 A1 | 8/2010 | Kovvali et al. |
| 2010/0235438 A1 | 9/2010 | Narayanan et al. |
| 2010/0235472 A1 | 9/2010 | Sood et al. |
| 2011/0032898 A1 | 2/2011 | Kazmi et al. |
| 2011/0082924 A1 | 4/2011 | Gopalakrishnan |
| 2011/0145726 A1 | 6/2011 | Wei et al. |
| 2011/0197239 A1 | 8/2011 | Schlack |
| 2012/0039191 A1 | 2/2012 | Foster et al. |
| 2012/0052866 A1 | 3/2012 | Froehlich et al. |
| 2012/0087260 A1 | 4/2012 | Devarapalli et al. |
| 2012/0311174 A1 | 12/2012 | Bichot et al. |
| 2013/0016620 A1 | 1/2013 | Den Hartog et al. |
| 2013/0163428 A1 | 6/2013 | Lee et al. |

* cited by examiner

Extracting a first size information about sizes of different frames of a first segment of an encrypted first streaming media flow that has a first constant bit rate (CBR), and extracting second size information about sizes of different frames of a second segment of a second streaming media flow that has a second CBR. The first CBR may equal the second CBR but they may differ from each other. 210

Calculating, based on the first size information, a relationship between sizes of frames of the first segment; and calculating, based on the second size information, a relationship between sizes of frames of the second segment. 221

Determining that the first encrypted streaming media flow has a higher quality than the second encrypted streaming media flow if (a) a difference between a smallest frame of the first segment and a largest frame of the first segment, is smaller than (b) a difference between a smallest frame of the second segment and a largest frame of the second segment. 222

Determining that the first encrypted streaming media flow has a higher quality than the second encrypted streaming media flow if (a) a number of frames of the first segment that have a size that exceeds a first threshold is lower than (b) a number of frames of the second segment that have a size that exceeds a first threshold; wherein the first threshold does not exceed a second smallest frame out of all frames included in the first and second segments. 223

Determining the relationship between the qualities of the first and second encrypted streaming media flows based on the first and second size information and based on a difference between the first and second CBR. 224

Determining a relationship between qualities of the first and second streaming media flows based on the first and second size information. 220

Performing a quality assessment responsive action in response to the relationship between qualities of the first and second encrypted streaming media flows. 230

Extracting a first size information about sizes of different frames of a first segment of an encrypted first streaming media flow that has a first constant bit rate (CBR), extracting second size information about sizes of different frames of a second segment of a second streaming media flow that has a second CBR, extracting first type information indicative of which frame of the first segment is the first reference frame and which frames of the first segment are the first non-reference frames and extracting second type information indicative of which frame of the second segment is the second reference frame and which frames of the second segment are the second non-reference frames. 310

Determining a relationship between qualities of the first and second streaming media flows based on the first and second size information and on the first and second type information. 320

Determining that the first encrypted streaming media flow has a higher quality than the second encrypted streaming media flow if a size of the first reference frame is bigger than a size of the second reference frame. 321

Determining that the first encrypted streaming media flow has a higher quality than the second encrypted streaming media flow if (a) a difference between a size of the first reference frame and a largest first non-reference frame is bigger than (b) a difference between a size of the second reference frame and a largest second non-reference frame. 322

Determining that the first encrypted streaming media flow has a higher quality than the second encrypted streaming media flow if (a) a ratio between a size of the first reference frame and a largest first non-reference frame is bigger than (b) a ratio between a size of the second reference frame and a largest second non-reference frame. 323

Determining the relationship between the qualities of the first and second encrypted streaming media flows based on the first and second size information and based on a difference between the first and second CBR. 325

Performing a quality assessment responsive action in response to the relationship between qualities of the first and second encrypted streaming media flows. 330

DEVICE AND METHOD FOR QUALITY ASSESSMENT OF ENCRYPTED STREAMING MEDIA FLOWS

RELATED APPLICATIONS

This application claims the priority of U.S. provisional patent Ser. No. 61/380,281 filing date Sep. 6, 2010 which is being incorporated herein by reference.

BACKGROUND OF THE INVENTION

Compressed video streams are now ubiquitous. They appear in broadcast television in over-the-air, cable and satellite transmissions. They appear in DVD and Blue-Ray discs and are the method for storing and viewing clips over the Internet. Video streaming using compression methods such as MPEG 2, H.264, VP6, VP8, VC1 and other (encoders-decoders) codecs is commonplace.

Some methods exist to automatically assess video quality of compressed streams. These can be roughly divided into three methods:
a. Full Reference (FR);
b. Reduced Reference (RR); and
c. No Reference (NR).

In FR methods, compressed video images are compared to the non-compressed original and a score is given to the compressed video sequence.

RR usually refers to a comparison of two non-original versions of video and in a NR case a video stream's quality is given a score without comparison to any other video stream. This case usually requires knowledge in the underlying compression method which is used.

Today's encoders are much more advanced than those used in the early days of video compression. They use sophisticated look-ahead functions in order to identify the amount of complexity ahead of them.

In streaming situations Constant Bit rate (CBR) encoding is typically used and the look-ahead functions allow the encoders to plan the bit allocation so that more bits are allocated to the more complex or more important frames. For example, all the codecs mentioned above use so-called "reference frames" where an encoded representation of a frame may include information which is also needed for the decoding of other frames. In cases where there is little change throughout a scene, an encoder would prefer to allocate as many bits possible to the reference frames and then use the codec's referencing capabilities in order to copy the information to the other frames.

Some cases exist where a device needs to quantify the quality of a compressed video stream where this device is not the ultimate device that encodes and presents the stream. One example is when an operator needs to know the visual quality of a stream that the network delivers. This can come in useful in cases such as rate shaping when a device within the network tries to supply streams at similar quality to different viewers or sets different qualities to streams according to predefined priorities.

In some cases the compressed streams are encrypted. In these cases the device which needs to assess the video quality may not be the destination device and therefore may not have the decrypting keys and may not be able to decode the streams partially or completely. In this case, known solutions to assess video quality will not work as they all require some layers of decoding in order to work.

SUMMARY OF THE INVENTION

A computer program product may be provided and may include a non-transitory computer readable medium that may store instructions for: extracting first size information about sizes of different frames of a first segment of an encrypted first streaming media flow that has a first constant bit rate (CBR); extracting second size information about sizes of different frames of a second segment of a second streaming media flow that has a second CBR; and determining a relationship between qualities of the first and second streaming media flows based on the first and second size information. The extracting of the first and second size information and the determining of the relationship may be executed without decrypting the first and second encrypted streaming media flows.

The first CBR may equal the second CBR or may differ from the second CBR.

The non-transitory computer readable medium may store instructions for calculating, based on the first size information, a relationship between sizes of frames of the first segment; and calculating, based on the second size information, a relationship between sizes of frames of the second segment.

The non-transitory computer readable medium may store instructions for determining that the first encrypted streaming media flow has a higher quality than the second encrypted streaming media flow if (a) a difference between a smallest frame of the first segment and a largest frame of the first segment, is smaller than (b) a difference between a smallest frame of the second segment and a largest frame of the second segment.

The non-transitory computer readable medium may store instructions for determining that the first encrypted streaming media flow has a higher quality than the second encrypted streaming media flow if (a) a number of frames of the first segment that have a size that exceeds a first threshold is lower than (b) a number of frames of the second segment that have a size that exceeds a first threshold. The first threshold may not exceed a second smallest frame out of all frames included in the first and second segments.

The first segment may include a first reference frame and multiple first non-reference frames; the second segment may include a second reference frame and multiple second non-reference frames. The non-transitory computer readable medium may store instructions for: extracting first type information indicative of which frame of the first segment is the first reference frame and which frames of the first segment are the first non-reference frames; extracting second type information indicative of which frame of the second segment is the second reference frame and which frames of the second segment are the second non-reference frames. The determining of the relationship between qualities of the first and second encrypted streaming media flows may be based on the first and second size information and on the first and second type information.

The non-transitory computer readable medium may store instructions for determining that the first encrypted streaming media flow has a higher quality than the second encrypted streaming media flow if a size of the first reference frame is bigger than a size of the second reference frame.

The non-transitory computer readable medium may store instructions for determining that the first encrypted streaming media flow has a higher quality than the second encrypted streaming media flow if (a) a difference between a size of the first reference frame and a largest first non-reference frame is bigger than (b) a difference between a size of the second reference frame and a largest second non-reference frame.

The non-transitory computer readable medium may store instructions for determining that the first encrypted streaming media flow has a higher quality than the second encrypted streaming media flow if (a) a ratio between a size of the first reference frame and a largest first non-reference frame is bigger than (b) a ratio between a size of the second reference frame and a largest second non-reference frame.

The first CBR differs from the second CBR and the method may include determining the relationship between the qualities of the first and second encrypted streaming media flows based on the first and second size information and based on a difference between the first and second CBRs.

The non-transitory computer readable medium may store instructions for performing a quality assessment responsive action in response to the relationship between qualities of the first and second encrypted streaming media flows.

The non-transitory computer readable medium may store instructions for assigning priority to the first and second encrypted streaming media flows.

The non-transitory computer readable medium may store instructions for determining a transmission time of at least one of the first and second encrypted streaming media flows based on the priority assigned to the first and second encrypted streaming media flows.

According to an embodiment of the invention a method for quality assessment is provided and may include: extracting first size information about sizes of different frames of a first segment of an encrypted first streaming media flow that has a first constant bit rate (CBR); extracting second size information about sizes of different frames of a second segment of a second streaming media flow that has a second CBR; and determining a relationship between qualities of the first and second streaming media flows based on the first and second size information. The extracting of the first and second size information and the determining of the relationship may be executed without decrypting the first and second encrypted streaming media flows.

The first CBR may be equal to the second CBR but may differ from it.

The method may include calculating, based on the first size information, a relationship between sizes of frames of the first segment; and calculating, based on the second size information, a relationship between sizes of frames of the second segment.

The method may include determining that the first encrypted streaming media flow has a higher quality than the second encrypted streaming media flow if (a) a difference between a smallest frame of the first segment and a largest frame of the first segment, is smaller than (b) a difference between a smallest frame of the second segment and a largest frame of the second segment.

The method may include determining that the first encrypted streaming media flow has a higher quality than the second encrypted streaming media flow if (a) a number of frames of the first segment that have a size that exceeds a first threshold is lower than (b) a number of frames of the second segment that have a size that exceeds a first threshold. The first threshold may not exceed a second smallest frame out of all frames included in the first and second segments.

The first segment may include a first reference frame and multiple first non-reference frames; the second segment may include a second reference frame and multiple second non-reference frames. The method may include: extracting first type information indicative of which frame of the first segment is the first reference frame and which frames of the first segment are the first non-reference frames; extracting second type information indicative of which frame of the second segment is the second reference frame and which frames of the second segment are the second non-reference frames; and the determining of the relationship between qualities of the first and second encrypted streaming media flows is based on the first and second size information and on the first and second type information.

The method may include determining that the first encrypted streaming media flow has a higher quality than the second encrypted streaming media flow if a size of the first reference frame is bigger than a size of the second reference frame.

The method may include determining that the first encrypted streaming media flow has a higher quality than the second encrypted streaming media flow if (a) a difference between a size of the first reference frame and a largest first non-reference frame is bigger than (b) a difference between a size of the second reference frame and a largest second non-reference frame.

The method may include determining that the first encrypted streaming media flow has a higher quality than the second encrypted streaming media flow if (a) a ratio between a size of the first reference frame and a largest first non-reference frame is bigger than (b) a ratio between a size of the second reference frame and a largest second non-reference frame.

The first CBR may differ from the second CBR and the method may include determining the relationship between the qualities of the first and second encrypted streaming media flows based on the first and second size information and based on a difference between the first and second CBR.

The method further may include performing a quality assessment responsive action in response to the relationship between qualities of the first and second encrypted streaming media flows.

The performing of the quality assessment responsive action may include assigning priority to the first and second encrypted streaming media flows.

The performing of the quality assessment responsive action may include determining a transmission time of at least one of the first and second encrypted streaming media flows based on the priority assigned to the first and second encrypted streaming media flows.

A device may be provided and may include: an information extractor arranged to: extract a first size information about sizes of different frames of a first segment of an encrypted first streaming media flow that has a first constant bit rate (CBR); and extract second size information about sizes of different frames of a second segment of a second streaming media flow that has a second CBR; and a quality assessment module, arranged to determine a relationship between qualities of the first and second streaming media flows based on the first and second size information. The information extractor may be arranged to extract of the first and second size information without decrypting the first and second encrypted streaming media flows. The quality assessment module may be arranged to determine the relationship between the qualities of the first and second streaming media flows without decrypting the first and second encrypted streaming media flows.

The first CBR may equal the second CBR or may differ from it.

The quality assessment module may be arranged to calculate, based on the first size information, a relationship between sizes of frames of the first segment; and calculate, based on the second size information, a relationship between sizes of frames of the second segment.

The quality assessment module may be arranged to determine that the first encrypted streaming media flow has a higher quality than the second encrypted streaming media flow if (a) a difference between a smallest frame of the first segment and a largest frame of the first segment, is smaller than (b) a difference between a smallest frame of the second segment and a largest frame of the second segment.

The quality assessment module may be arranged to determine that the first encrypted streaming media flow has a higher quality than the second encrypted streaming media flow if (a) a number of frames of the first segment that have a size that exceeds a first threshold is lower than (b) a number of frames of the second segment that have a size that exceeds a first threshold. The first threshold may not exceed a second smallest frame out of all frames included in the first and second segments.

The first segment may include a first reference frame and multiple first non-reference frames; the second segment may include a second reference frame and multiple second non-reference frames; the information extractor may be arranged to extract first type information indicative of which frame of the first segment is the first reference frame and which frames of the first segment are the first non-reference frames and extract second type information indicative of which frame of the second segment is the second reference frame and which frames of the second segment are the second non-reference frames; and the quality assessment module may be arranged to determine the relationship between qualities of the first and second encrypted streaming media flows based on the first and second size information and on the first and second type information.

The quality assessment module may be arranged to determine that the first encrypted streaming media flow has a higher quality than the second encrypted streaming media flow if a size of the first reference frame is bigger than a size of the second reference frame.

The quality assessment module may be arranged to determine that the first encrypted streaming media flow has a higher quality than the second encrypted streaming media flow if (a) a difference between a size of the first reference frame and a largest first non-reference frame is bigger than (b) a difference between a size of the second reference frame and a largest second non-reference frame.

The quality assessment module may be arranged to determine that the first encrypted streaming media flow has a higher quality than the second encrypted streaming media flow if (a) a ratio between a size of the first reference frame and a largest first non-reference frame is bigger than (b) a ratio between a size of the second reference frame and a largest second non-reference frame.

The first CBR may differ from the second CBR and the quality assessment module may be arranged to determine the relationship between the qualities of the first and second encrypted streaming media flows based on the first and second size information and base don a difference between the first and second CBR.

The device may include a response module that may be arranged to perform a quality assessment responsive action in response to the relationship between qualities of the first and second encrypted streaming media flows.

The response module may be arranged to assign priority to the first and second encrypted streaming media flows.

The quality assessment module may be arranged to determine a transmission time of at least one of the encrypted first and second streaming media flows based on the priority assigned to the first and second encrypted streaming media flows.

According to an embodiment of the invention a method for quality assessment may be provided and may include receiving multiple media streams; and evaluating quality differences between the multiple media streams by comparing actual or estimates sizes of frames of the multiple media streams.

The method may include performing a quality assessment responsive action in response to the evaluated quality differences.

A computer program product may be provided and may include a non-transitory computer readable medium that may store instructions for: receiving multiple media streams; and evaluating quality differences between the multiple media streams by comparing actual or estimates sizes of frames of the multiple media streams.

The non-transitory computer readable medium may store instructions for performing a quality assessment responsive action in response to the evaluated quality differences.

According to an embodiment of the invention a device for quality assessment may be provided and may include: an interface arranged to receive multiple media streams; and a media quality assessment module arranged to evaluate quality differences between the multiple media streams by comparing actual or estimates sizes of frames of the multiple media streams.

The media quality assessment module may be arranged to perform a quality assessment responsive action in response to the evaluated quality differences.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a flow chart of a method according to an embodiment of the invention;

FIG. 3 is a flow chart of a method according to an embodiment of the invention;

Figure 1:
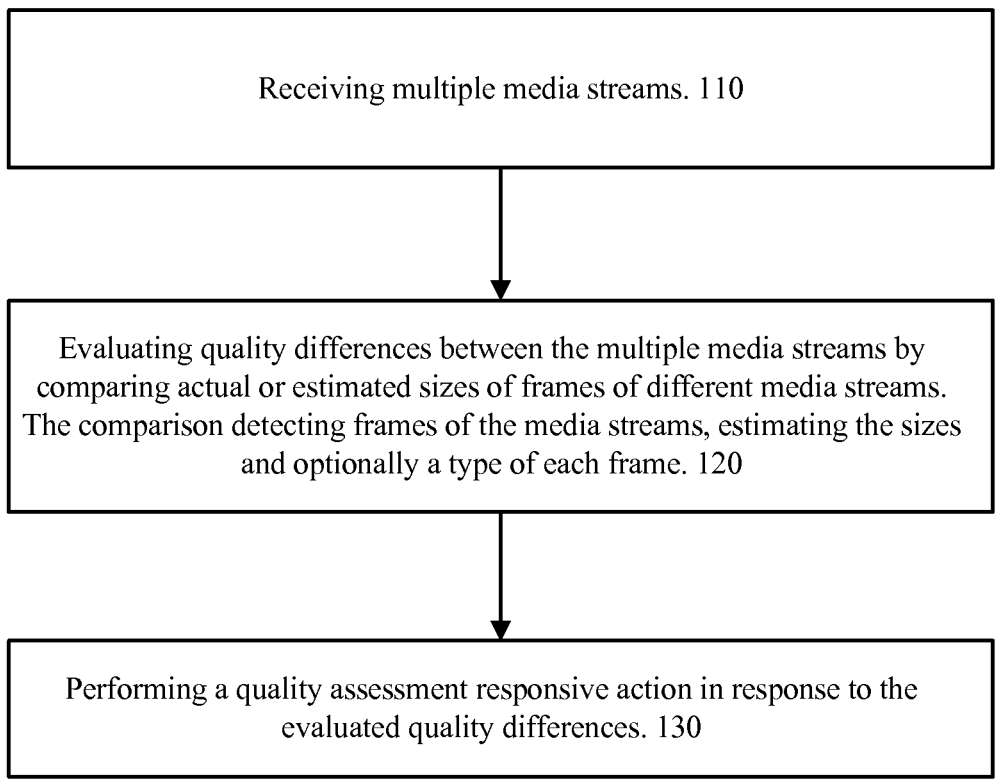
FIG. 1 is a flow chart of a method according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The term "streaming media flow" can have its ordinary meaning as well as can include media information that is either streamed to a client or is expected to be streamed to a client. For example, a streaming media flow can pass through an intermediate device that may receive the streaming media flow from a media source. The streaming media flow refers to the information that is sent from the media source to the intermediate device and may refer to the streaming media flow that is sent towards the client. A non-limiting example of a streaming media flow environment is provided in U.S. patent application Ser. No. 13/109,019 filing date May 17, 2011 which is incorporated herein by reference.

A segment of a streaming media flow can include multiple frames. It may also be referred to as a chunk although it can differ from a chunk. A segment can be requested by a client by one or more chunk requests. A segment can include 2-3 seconds of a streaming media flow but this is not necessarily so.

In most cases, especially in live streaming events, some headers always remain in the clear (non-encrypted). Even if these headers are not part of the coded stream, there may be some size information in the encapsulating layer. Most of the time, it is possible to identify the frame boundaries within the stream.

The illustrated methods, devices and computer program products may relay only on size information about frame sizes and, if possible, also on frame types in order to assess a stream and at least to give it a score relative to other streams.

When looking at streams encoded at CBR—it can be seen that the relative size of the frames gives clues to the complexity of the scene. For example, if reference frames are very large and non reference frames are very small, this would imply that there is little motion in the stream and the stream is not very complex. As stated above, streaming is done with CBR streams and the bit rates are set at known values.

Comparing the frame sizes of two streams that were encoded at the same bit rate, allows a comparison between the two, and allows assessing the quality of one stream relative to the quality of the other stream. It should be noted that frame types can be deduced from the relative frame sizes within a stream, from the order of the frames of a combination thereof. In most cases it is expected that reference frames are larger than non reference frames.

The actual numbers needed for assessment of the quality may be codec dependent and are a function of some parameters such as bit rate, frame rate, resolution, etc. Nevertheless, comparison can be performed even with many of these parameters missing. It should also be noted that the underlying methods in all the codecs practically utilized today use the same encoding ideas including the use of reference frames.

Some simple examples are now given:
a. Suppose three steams are encoded using the same codec and all three are encoded using the same bit rate (CBR). All three streams are composed of segments that include 15 frames. We shall look at a segment which has one intra-encoded frame (frame which may include all the information needed for its decoding). These frames are used as reference frames. For the sake of simplicity, let's assume that all the subsequent frames use this one frame as their only reference frame. In Stream 1, the reference frame's size is 86% of the segment and the other 14 frames' sizes is 1% each. In Stream 2, the reference frame's size is 58% of the stream and the other frames are even at 3%. In Stream 3, the reference frame's size is 16% and the other frames are at 6% each. In this case, one can safely say that the quality of Stream 1 is somewhat better than the quality of Stream 2 and that Stream 2 is much better than Stream 3.
b. In another simple example, the same Stream 3 from the example above is given, Stream 4 has a reference frame which also amounts to 16% of the segment. The other 14 frames are sized in the following way: 13 of the frames are 1% each and the 14th frame is 58% of the segment. In this case, one can conclude that in general, the quality of Stream 4 is better than that of Stream 2, however, one frame seems to be in lower quality than the other frames in the segment.

The invention allows a rudimentary assessment of video quality of encrypted compressed streams without the need for passing decryption keys or any other method which would jeopardize the quality of the encryption device. This allows devices within the operator's network to make decisions and create reports which benefit the operator and can create a better viewer experience for the users of the network.

FIG. 1 illustrates method 100 according to an embodiment of the invention.

Method 100 starts by stage 110 of receiving multiple media streams.

Stage 110 may be followed by stage 120 of evaluating quality differences between the multiple media streams by comparing actual or estimated sizes of frames of different media streams. The comparison may include detecting frames of the media streams, estimating the sizes and optionally a type of each frame.

Stage 120 may be followed by stage 130 of performing a quality assessment responsive action in response to the evaluated quality differences.

Stage 130 may include assigning priority to media streams, compressing media streams that are not encrypted to allocate more bandwidth to the encrypted streaming media flows, determining a transmission time of a media stream and the like based on a priority assigned to the media stream.

FIG. 2 illustrates method 200 according to an embodiment of the invention.

Method 200 may start by stage 210 of extracting a first size information about sizes of different frames of a first segment of an encrypted first streaming media flow that has a first constant bit rate (CBR), and extracting second size information about sizes of different frames of a second segment of a second streaming media flow that has a second CBR. The first CBR may equal the second CBR but they may differ from each other.

Stage 210 may be followed by stage 220 of determining a relationship between qualities of the first and second streaming media flows based on the first and second size information.

The extracting (210) of the first and second size information and the determining (220) of the relationship are executed without decrypting the first and second encrypted streaming media flows. Accordingly—method 200 may be executed without decrypting the encrypted first and second streaming media flows.

The first CBR may equal the second CBR.

Stage 220 may include any of stages 221, 222, 223 and 224 or any combination of these stages.

Stage 221 may include calculating, based on the first size information, a relationship between sizes of frames of the first segment; and calculating, based on the second size information, a relationship between sizes of frames of the second segment.

Stage 222 may include determining that the first encrypted streaming media flow has a higher quality than the second encrypted streaming media flow if (a) a difference between a smallest frame of the first segment and a largest frame of the first segment, is smaller than (b) a difference between a smallest frame of the second segment and a largest frame of the second segment.

Stage 223 may include determining that the first encrypted streaming media flow has a higher quality than the second encrypted streaming media flow if (a) a number of frames of the first segment that have a size that exceeds a first threshold is lower than (b) a number of frames of the second segment that have a size that exceeds a first threshold; wherein the first threshold does not exceed a second smallest frame out of all frames included in the first and second segments.

The first CBR may differ from the second CBR. In this case stage 220 may include stage 224 of determining the relationship between the qualities of the first and second encrypted streaming media flows based on the first and second size information and based on a difference between the first and second CBR.

Stage 220 can be followed by stage 230 of performing a quality assessment responsive action in response to the relationship between qualities of the first and second encrypted streaming media flows.

FIG. 3 illustrates method 300 according to an embodiment of the invention.

Method 300 may start by stage 310 of extracting a first size information about sizes of different frames of a first segment of an encrypted first streaming media flow that has a first constant bit rate (CBR), extracting second size information about sizes of different frames of a second segment of a second streaming media flow that has a second CBR, extracting first type information indicative of which frame of the first segment is the first reference frame and which frames of the first segment are the first non-reference frames and extracting second type information indicative of which frame of the second segment is the second reference frame and which frames of the second segment are the second non-reference frames. The first CBR may equal the second CBR but they may differ from each other.

Stage 310 may be followed by stage 320 of determining a relationship between qualities of the first and second streaming media flows based on the first and second size information and on the first and second type information.

The extracting (310) of the first and second size information and the determining (320) of the relationship are executed without decrypting the first and second encrypted streaming media flows. Accordingly—method 300 may be executed without decrypting the encrypted first and second streaming media flows.

The first CBR may equal the second CBR.

Stage 320 may include at least one of stages 321, 322, 323, 324 and 325 or a combination thereof.

Stage 321 may include determining that the first encrypted streaming media flow has a higher quality than the second encrypted streaming media flow if a size of the first reference frame is bigger than a size of the second reference frame.

Stage 322 may include determining that the first encrypted streaming media flow has a higher quality than the second encrypted streaming media flow if (a) a difference between a size of the first reference frame and a largest first non-reference frame is bigger than (b) a difference between a size of the second reference frame and a largest second non-reference frame.

Stage 323 may include determining that the first encrypted streaming media flow has a higher quality than the second encrypted streaming media flow if (a) a ratio between a size of the first reference frame and a largest first non-reference frame is bigger than (b) a ratio between a size of the second reference frame and a largest second non-reference frame.

The first CBR may differ from the second CBR. In this case stage 320 may include stage 325 of determining the relationship between the qualities of the first and second encrypted streaming media flows based on the first and second size information and based on a difference between the first and second CBR.

Stage 320 may be followed by stage 330 of performing a quality assessment responsive action in response to the relationship between qualities of the first and second encrypted streaming media flows.

Stage 330 may include at least one of assigning priority to the first and second encrypted streaming media flows, compressing at least one of the first and second non-encrypted streaming media flows and determining a transmission time of at least one of the first and second encrypted streaming media flows based on priorities assigned to the first and second encrypted streaming media flows.

Each one of method 100, 200 and 300 can be can be implemented by a non-transitory computer readable medium that may be a part of a computer program product such as a disk, a diskette, a tape and the like.

Figure 4:
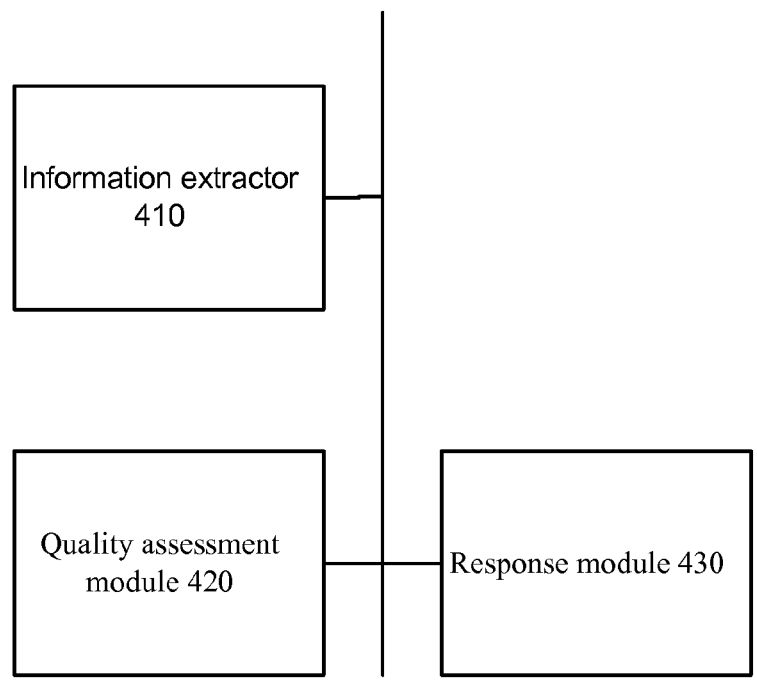
FIG. 4 illustrates a device according to an embodiment of the invention.

Each one of methods 100, 200 and 300 can be executed by a device such as device 400 of FIG. 4.

FIG. 4 illustrates device 400 according to an embodiment of the invention.

Device 400 can be implemented practically anywhere. It can be implemented on storage devices or anywhere along a delivery route. It can be implemented on device levels such as routers or switches and it can be implemented in functional locations such as headends, hubs, central offices, etc.

Device 400 may include an information extractor 410, a quality assessment module 420 and a response module 430. These modules can be implemented by a combination of a processor and a storage device. Response module 430 can be coupled to device 400 instead of being included in device 400.

The information extractor 410 may be arranged to extract a first size information about sizes of different frames of a first segment of an encrypted first streaming media flow that has a first constant bit rate (CBR); and extract second size information about sizes of different frames of a second segment of a second streaming media flow that has a second CBR.

The extraction of the size information can be done by any known extraction method, such as extraction of size information from non-encrypted headers of transport streams or other frames or packets that include either an indication of frame boundaries or may include explicit frame size information. The extraction may vary according to the communication protocols that are used to convey the streaming media flows.

The quality assessment module 420 may be arranged to determine a relationship between qualities of the first and second streaming media flows based on the first and second size information.

The information extractor 410 may be arranged to extract the first and second size information without decrypting the first and second encrypted streaming media flows.

The quality assessment module 420 may be arranged to determine the relationship between the qualities of the first and second streaming media flows without decrypting the first and second encrypted streaming media flows.

The first CBR may equal the second CBR or may differ from the second CRB. If the latter occurs then the quality assessment module 420 may be arranged to determine the relationship between the qualities of the first and second encrypted streaming media flows based on the first and second size information and based on a difference between the first and second CBR.

The response module 430 may be arranged to perform a quality assessment responsive action in response to the relationship between qualities of the first and second encrypted streaming media flows. The response module may be arranged to assign priority to the first and second encrypted streaming media flows, to compress at least one of the first and second encrypted streaming media flows, to determine a transmission time of at least one of the encrypted first and second streaming media flows, or perform a combination of any of these options.

The quality assessment module 420 may be arranged to perform at least one of the following, or a combination thereof:
  a. Calculate, based on the first size information, a relationship between sizes of frames of the first segment; and calculate, based on the second size information, a relationship between sizes of frames of the second segment.
  b. Determine that the first encrypted streaming media flow has a higher quality than the second encrypted streaming media flow if (a) a difference between a smallest frame of the first segment and a largest frame of the first segment, is smaller than (b) a difference between a smallest frame of the second segment and a largest frame of the second segment.
  c. Determine that the first encrypted streaming media flow has a higher quality than the second encrypted streaming media flow if (a) a number of frames of the first segment that have a size that exceeds a first threshold is lower than (b) a number of frames of the second segment that have a size that exceeds a first threshold; wherein the first threshold does not exceed a second smallest frame out of all frames included in the first and second segments.

According to an embodiment of the invention the quality assessment is also responsive to a type of a frame-reference frame or non-reference frame. A reference frame is a frame that is required during the decoding of the reference frame itself and other frames. A non-reference frame is a frame that only the decoding process of the non reference frame makes use of the non-reference frame.

Thus, according to this embodiment the first segment comprises a first reference frame and multiple first non-reference frames; wherein the second segment comprises a second reference frame and multiple second non-reference frames. It is noted that there may be more than one reference frames and even among reference frames there may be a hierarchy—so that some reference frames will be removed before others. Referring to MPEG-2, P frames can be removed before removing I frames.

The information extractor 410 may be arranged to extract first type information indicative of which frame of the first segment is the first reference frame and which frames of the first segment are the first non-reference frames and extract second type information indicative of which frame of the second segment is the second reference frame and which frames of the second segment are the second non-reference frames.

The quality assessment module 420 may be arranged to determine the relationship between qualities of the first and second encrypted streaming media flows based on the first and second size information and on the first and second type information.

The quality assessment module 420 may be arranged to perform at least one of the following:
  d. Determine that the first encrypted streaming media flow has a higher quality than the second encrypted streaming media flow if a size of the first reference frame is bigger than a size of the second reference frame.
  e. Determine that the first encrypted streaming media flow has a higher quality than the second encrypted streaming media flow if (a) a difference between a size of the first reference frame and a largest first non-reference frame is bigger than (b) a difference between a size of the second reference frame and a largest second non-reference frame.
  f. Determine that the first encrypted streaming media flow has a higher quality than the second encrypted streaming media flow if (a) a ratio between a size of the first reference frame and a largest first non-reference frame is bigger than (b) a ratio between a size of the second reference frame and a largest second non-reference frame.
  g. Determine that the first encrypted streaming media flow has a higher quality than the second encrypted streaming media flow if a largest first non-reference frame is bigger than a largest second non-reference frame.

Figure 5:
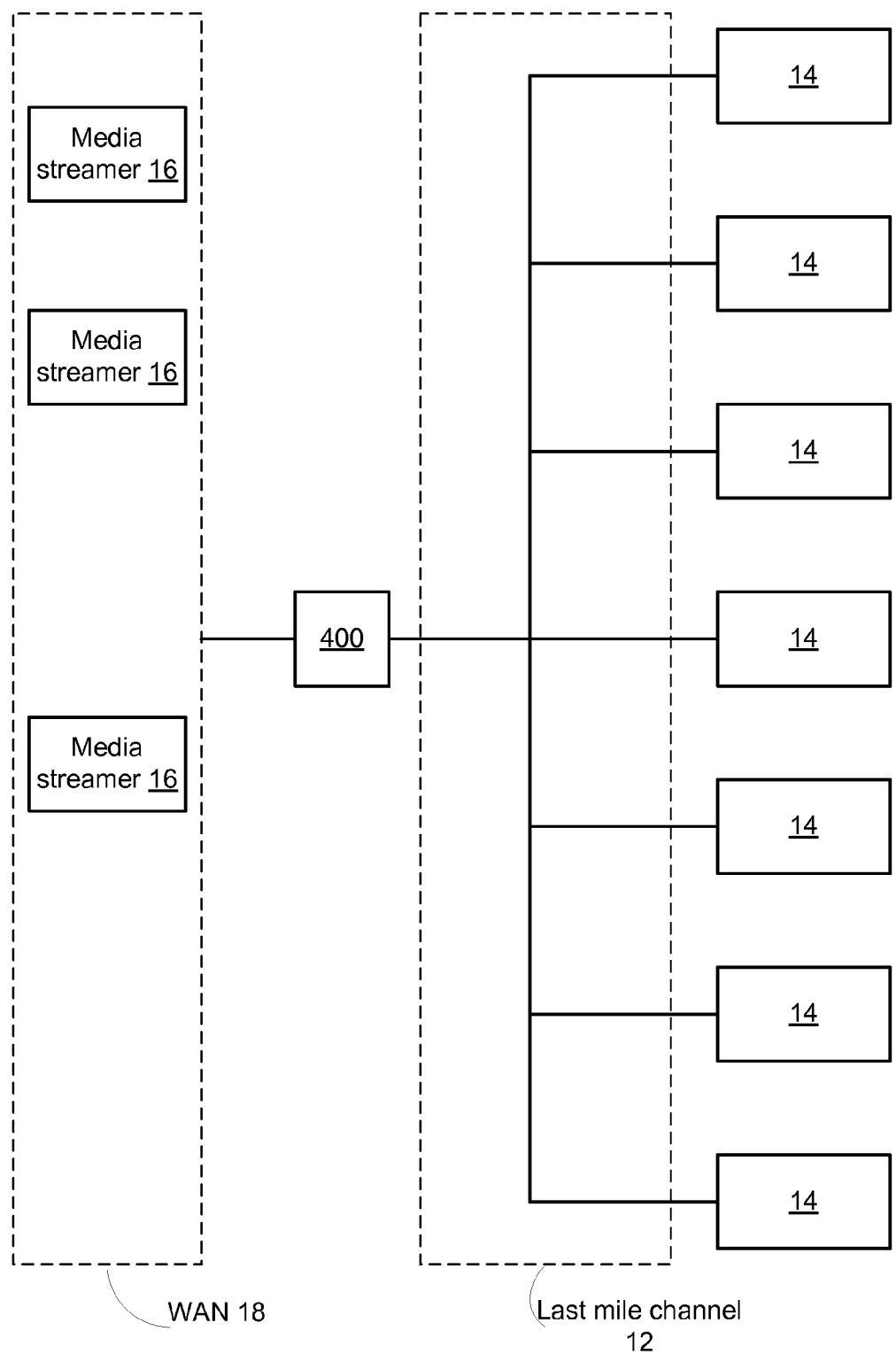
FIG. 5 illustrates a device and its environment according to an embodiment of the invention.

FIG. 5 illustrates device 400 and its environment, according to an embodiment of the invention.

Device 400 is connected between a WAN (such as the Internet) 18, a last mile channel 12 and user devices that host clients 14. The WAN 18 may include multiple media streamers 16.

The device 400 may reside before a bandwidth limiting resource, or otherwise can be able to participate in the bit rate control of the bandwidth limited resource. The device 400 may be a router, an aggregator, a switch, a controller, or a combination thereof. The system can include hardware, software firmware or a combination thereof.

The clients 14 can send to the device 400 chunk requests. A chunk request is a request to receive a media chunk of a streaming media flow. The streaming media flow may include a media file that is being streamed towards a client. The chunk request may include a chunk identifier and a bit rate (bit rate) request that indicated the desired bit rate of the requested chunk. The requested bit rate can be defined in an explicit manner (for example—the value of the requested bit rate can be included in the chunk request) or implicitly (for example—the chunk identifier may point to a certain version of the media chunk—of a known bit rate). The chunk request can include a URL that is specific to a specific segment and a specific bit rate. The term "last mile" may have its regular meaning. For example, it may have the meaning defined by www.wikipedia.org: "The "last mile" or "last kilometer" is the last mile of delivering connectivity from a communications provider to a customer. The phrase is therefore often used by the telecommunications and cable television industries. The actual distance of this leg may be considerably more than a mile, especially in rural areas. It is typically seen as an expensive challenge because "fanning out" wires and cables is a considerable physical undertaking. Because the last mile of a network to the user is also the first mile from the user to the world in regards to sending data (such as uploading), the term "first mile" is sometimes used.

It is noted that any of the methods and any of the devices can repeat their analysis for each segment of the streaming media flows, for selected segments only, operate in a repetitive manner (once per each X segments, wherein X can exceed 1), in response to events (such as request to perform quality assessment, reaching predefined aggregate bit rate values, quality reduction, communication errors, and the like).

It is further noted that the comparison is not limited to comparison he quality between two streaming media flows and that the comparison can be expanded to more than two streaming media flows.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer program product comprising a non-transitory computer readable medium that stores instructions, the instructions when executed on a computer causing the computer to perform:
- extracting first size information about sizes of different frames of a first segment of an encrypted first streaming media flow that has a first constant bit rate (CBR);
- extracting second size information about sizes of different frames of a second segment of a second streaming media flow that has a second CBR; and
- determining a relationship between qualities of the first and second streaming media flows based on the first and second size information; and
- wherein the extracting of the first and second size information and the determining of the relationship are executed without decrypting the first and second encrypted streaming media flows;
- wherein the first CBR equals the second CBR;
- wherein the non-transitory computer readable medium stores instructions for determining that a quality of the first encrypted streaming media flow is higher than a quality of the second encrypted streaming media flow if at least one of the following is true:
  (i) a difference between a smallest frame of the first segment and a largest frame of the first segment, is smaller than a difference between a smallest frame of the second segment and a largest frame of the second segment; and
  (ii) a number of frames of the first segment that have a size that exceeds a first threshold is lower than a number of frames of the second segment that have a size that exceeds the first threshold; wherein the first threshold does not exceed a second smallest frame out of all frames included in the first and second segments.

2. The computer program product according to claim 1, wherein the non-transitory computer readable medium stores instructions for:
- calculating, based on the first size information, a relationship between sizes of frames of the first segment; and
- calculating, based on the second size information, a relationship between sizes of frames of the second segment.

3. The computer program product according to claim 1, wherein the non-transitory computer readable medium stores instructions for determining that the quality of the first encrypted streaming media flow is higher than the quality of the second encrypted streaming media flow if the difference between the smallest frame of the first segment and the largest frame of the first segment, is smaller than (b) the difference between the smallest frame of the second segment and the largest frame of the second segment.

4. The computer program product according to claim 1, wherein the non-transitory computer readable medium stores instructions for determining that the quality of the first encrypted streaming media flow is higher than the quality of the second encrypted streaming media flow if the number of frames of the first segment that have the size that exceeds the first threshold is lower than the number of frames of the second segment that have the size that exceeds the first threshold;
- wherein the first threshold does not exceed the second smallest frame out of all frames included in the first and second segments.

5. The computer program product according to claim 1, wherein the non-transitory computer readable medium stores instructions for performing a quality assessment responsive action in response to the relationship between qualities of the first and second encrypted streaming media flows.

6. The computer program product according to claim 5, wherein the non-transitory computer readable medium stores instructions for assigning priority to the first and second encrypted streaming media flows.

7. The computer program product according to claim 5, wherein the non-transitory computer readable medium stores instructions for determining a transmission time of at least one of the first and second encrypted streaming media flows based on the priority assigned to the first and second encrypted streaming media flows.

8. A method for quality assessment, the method comprises:
- extracting first size information about sizes of different frames of a first segment of an encrypted first streaming media flow that has a first constant bit rate (CBR);
- extracting second size information about sizes of different frames of a second segment of a second streaming media flow that has a second CBR; and
- determining a relationship between qualities of the first and second streaming media flows based on the first and second size information; and
- wherein the extracting of the first and second size information and the determining of the relationship are executed without decrypting the first and second encrypted streaming media flows;
- wherein the first CBR equals the second CBR; and
- determining that a quality of the first encrypted streaming media flow is higher than a quality of the second encrypted streaming media flow if at least one of the following is true:
  (i) a difference between a smallest frame of the first segment and a largest frame of the first segment, is smaller than a difference between a smallest frame of the second segment and a largest frame of the second segment; and
  (ii) a number of frames of the first segment that have a size that exceeds a first threshold is lower than a number of frames of the second segment that have a size that exceeds the first threshold; wherein the first threshold does not exceed a second smallest frame out of all frames included in the first and second segments.

9. The method according to claim 8, comprising:
- calculating, based on the first size information, a relationship between sizes of frames of the first segment; and
- calculating, based on the second size information, a relationship between sizes of frames of the second segment.

10. The method according to claim 8, comprising determining that the quality of the first encrypted streaming media flow is higher than the quality of the second encrypted streaming media flow if the difference between a smallest frame of the first segment and the largest frame of the first segment, is smaller than the difference between the smallest frame of the second segment and the largest frame of the second segment.

11. The method according to claim 8, comprising determining that the quality of the first encrypted streaming media flow is higher than the quality of the second encrypted streaming media flow if the number of frames of the first segment that have the size that exceeds the first threshold is lower than the number of frames of the second segment that have the size that exceeds the first threshold;
- wherein the first threshold does not exceed the second smallest frame out of all frames included in the first and second segments.

12. The method according to claim 8 further comprising performing a quality assessment responsive action in response to the relationship between qualities of the first and second encrypted streaming media flows.

13. The method according to claim 12, wherein the performing of the quality assessment responsive action comprises assigning priority to the first and second encrypted streaming media flows.

14. The method according to claim 12, wherein the performing of the quality assessment responsive action comprises determining a transmission time of at least one of the first and second encrypted streaming media flows based on the priority assigned to the first and second encrypted streaming media flows.

15. A device, comprising:
an information extractor arranged to:
extract a first size information about sizes of different frames of a first segment of an encrypted first streaming media flow that has a first constant bit rate (CBR); and
extract second size information about sizes of different frames of a second segment of a second streaming media flow that has a second CBR; and
a quality assessment module, arranged to determine a relationship between qualities of the first and second streaming media flows based on the first and second size information; and
wherein the information extractor is arranged to extract of the first and second size information without decrypting the first and second encrypted streaming media flows; and
wherein the quality assessment module is arranged to determine the relationship between the qualities of the first and second streaming media flows without decrypting the first and second encrypted streaming media flows;
wherein the first CBR equals the second CBR;
wherein the quality assessment module is arranged to determine that a quality of the first encrypted streaming media flow is higher that than a quality of the second encrypted streaming media flow if at least one of the following is true:
(i) a difference between a smallest frame of the first segment and a largest frame of the first segment, is smaller than a difference between a smallest frame of the second segment and a largest frame of the second segment; and
(ii) a number of frames of the first segment that have a size that exceeds a first threshold is lower than a number of frames of the second segment that have a size that exceeds the first threshold; wherein the first threshold does not exceed a second smallest frame out of all frames included in the first and second segments.

16. The device to claim 15, wherein the quality assessment module is arranged to calculate, based on the first size information, a relationship between sizes of frames of the first segment; and calculate, based on the second size information, a relationship between sizes of frames of the second segment.

17. The device to claim 15, wherein the quality assessment module is arranged to determine that the quality of the first encrypted streaming media flow is higher than the quality of the second encrypted streaming media flow if a difference between a smallest frame of the first segment and a largest frame of the first segment, is smaller than a difference between a smallest frame of the second segment and a largest frame of the second segment.

18. The device to claim 15, wherein the quality assessment module is arranged to determine that the quality of the first encrypted streaming media flow is higher than the quality of the second encrypted streaming media flow if a number of frames of the first segment that have a size that exceeds a first threshold is lower than a number of frames of the second segment that have a size that exceeds a first threshold;
wherein the first threshold does not exceed the second smallest frame out of all frames included in the first and second segments.

19. The device according to claim 15, comprising a response module that is arranged to perform a quality assessment responsive action in response to the relationship between qualities of the first and second encrypted streaming media flows.

20. The device according to claim 19, wherein the response module is arranged to assign priority to the first and second encrypted streaming media flows.

21. The device according to claim 19, wherein the quality assessment module is arranged to determine a transmission time of at least one of the encrypted first and second streaming media flows based on the priority assigned to the first and second encrypted streaming media flows.

* * * * *